US007787518B2

(12) United States Patent
Narayan et al.

(10) Patent No.: US 7,787,518 B2
(45) Date of Patent: Aug. 31, 2010

(54) METHOD AND APPARATUS FOR SELECTIVELY APPLYING INTERFERENCE CANCELLATION IN SPREAD SPECTRUM SYSTEMS

(75) Inventors: Anand P. Narayan, Boulder, CO (US); Eric S. Olson, Boulder, CO (US); Prashant Jain, Northglenn, CO (US)

(73) Assignee: Rambus Inc., Los Altos, CA (US)

( * ) Notice: Subject to any disclaimer, the term of this patent is extended or adjusted under 35 U.S.C. 154(b) by 1954 days.

(21) Appl. No.: 10/669,954

(22) Filed: Sep. 23, 2003

(65) Prior Publication Data
US 2007/0183483 A1    Aug. 9, 2007

Related U.S. Application Data

(60) Provisional application No. 60/412,550, filed on Sep. 23, 2002.

(51) Int. Cl.
*H04B 1/69* (2006.01)
(52) U.S. Cl. ........................... 375/144; 375/130
(58) Field of Classification Search ............... 375/144, 375/130, 148, 346, 284, 285; 370/479, 343, 370/335, 441
See application file for complete search history.

(56) References Cited

U.S. PATENT DOCUMENTS

| 3,742,201 A | 6/1973 | Groginsky |
| 4,088,955 A | 5/1978 | Baghdady |
| 4,309,769 A | 1/1982 | Taylor, Jr. |
| 4,359,738 A | 11/1982 | Lewis |
| 4,601,046 A | 7/1986 | Halpern |
| 4,665,401 A | 5/1987 | Garrard et al. |
| 4,670,885 A | 6/1987 | Parl et al. |
| 4,713,794 A | 12/1987 | Byington et al. |
| 4,780,885 A | 10/1988 | Paul et al. |

(Continued)

FOREIGN PATENT DOCUMENTS

DE    4201439 A1    7/1993

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Khai Tran
(74) *Attorney, Agent, or Firm*—Barcelo & Harrison, LLP

(57) ABSTRACT

The present invention is directed to the selective provision of interference canceled signal streams to demodulating fingers in a communication receiver. According to the present invention, potential interferer signal paths are identified. Signal streams having one or more potential interferer signals removed or canceled are created, and a correlation is performed to determine whether the strength of a desired signal path increased as a result. If the correlation indicates that the strength of a desired signal path was increased by the signal cancellation, the interference canceled signal stream is provided to the demodulation finger assigned to track the desired signal path. If the correlation determines that the strength of the desired signal path did not increase as a result of performing interference cancellation, the raw or a different interference canceled signal stream is provided to the demodulation finger.

42 Claims, 15 Drawing Sheets

U.S. PATENT DOCUMENTS

| | | | |
|---|---|---|---|
| 4,856,025 A | 8/1989 | Takai | |
| 4,893,316 A | 1/1990 | Janc et al. | |
| 4,922,506 A | 5/1990 | McCallister et al. | |
| 4,933,639 A | 6/1990 | Barker | |
| 4,965,732 A | 10/1990 | Roy, III et al. | |
| 5,017,929 A | 5/1991 | Tsuda | |
| 5,099,493 A | 3/1992 | Zeger et al. | |
| 5,105,435 A | 4/1992 | Stilwell | |
| 5,109,390 A | 4/1992 | Gilhousen et al. | |
| 5,119,401 A | 6/1992 | Tsujimoto | |
| 5,136,296 A | 8/1992 | Roettger et al. | |
| 5,151,919 A | 9/1992 | Dent | |
| 5,218,359 A | 6/1993 | Minamisono | |
| 5,218,619 A | 6/1993 | Dent | |
| 5,220,687 A | 6/1993 | Ichikawa et al. | |
| 5,224,122 A | 6/1993 | Bruckert | |
| 5,237,586 A | 8/1993 | Bottomley | |
| 5,263,191 A | 11/1993 | Dickerson | |
| 5,280,472 A | 1/1994 | Gilhousen et al. | |
| 5,305,349 A | 4/1994 | Dent | |
| 5,325,394 A | 6/1994 | Bruckert | |
| 5,343,493 A | 8/1994 | Karimullah | |
| 5,343,496 A | 8/1994 | Honig et al. | |
| 5,347,535 A | 9/1994 | Karasawa et al. | |
| 5,353,302 A | 10/1994 | Bi | |
| 5,377,183 A | 12/1994 | Dent | |
| 5,386,202 A | 1/1995 | Cochran et al. | |
| 5,390,207 A | 2/1995 | Fenton et al. | |
| 5,394,110 A | 2/1995 | Mizoguchi | |
| 5,396,256 A | 3/1995 | Chiba et al. | |
| 5,437,055 A | 7/1995 | Wheatley, III | |
| 5,440,265 A | 8/1995 | Cochran et al. | |
| 5,448,600 A | 9/1995 | Lucas | |
| 5,481,570 A | 1/1996 | Winters | |
| 5,506,865 A | 4/1996 | Weaver, Jr. | |
| 5,513,176 A | 4/1996 | Dean et al. | |
| 5,533,011 A | 7/1996 | Dean et al. | |
| 5,553,098 A | 9/1996 | Cochran et al. | |
| 5,600,670 A | 2/1997 | Turney | |
| 5,602,833 A | 2/1997 | Zehavi | |
| 5,644,592 A | 7/1997 | Divsalar | |
| 5,736,964 A | 4/1998 | Ghosh et al. | |
| 5,787,130 A | 7/1998 | Kotzin et al. | |
| 5,844,521 A | 12/1998 | Stephens et al. | |
| 5,859,613 A | 1/1999 | Otto | |
| 5,872,540 A | 2/1999 | Casabona | |
| 5,872,776 A | 2/1999 | Yang | |
| 5,894,500 A | 4/1999 | Bruckert et al. | |
| 5,926,761 A | 7/1999 | Reed et al. | |
| 5,930,229 A | 7/1999 | Yoshida et al. | |
| 5,953,369 A | 9/1999 | Suzuki | |
| 5,978,413 A | 11/1999 | Bender | |
| 5,995,499 A | 11/1999 | Hottinen et al. | |
| 6,002,727 A | 12/1999 | Uesugi | |
| 6,014,373 A | 1/2000 | Schilling et al. | |
| 6,018,317 A | 1/2000 | Dogan et al. | |
| 6,032,056 A | 2/2000 | Reudink | |
| 6,078,611 A | 6/2000 | La Rosa et al. | |
| 6,088,383 A | 7/2000 | Suzuki et al. | |
| 6,101,385 A | 8/2000 | Monte et al. | |
| 6,104,712 A | 8/2000 | Robert et al. | |
| 6,115,409 A | 9/2000 | Upadhyay et al. | |
| 6,127,973 A | 10/2000 | Choi et al. | |
| 6,131,013 A | 10/2000 | Bergstrom et al. | |
| 6,137,788 A | 10/2000 | Sawahashi et al. | |
| 6,141,332 A | 10/2000 | Lavean | |
| 6,154,443 A | 11/2000 | Huang et al. | |
| 6,157,685 A | 12/2000 | Tanaka et al. | |
| 6,157,842 A | 12/2000 | Kaisson et al. | |
| 6,157,847 A | 12/2000 | Buehrer et al. | |
| 6,163,696 A | 12/2000 | Bi et al. | |
| 6,166,690 A | 12/2000 | Lin et al. | |
| 6,172,969 B1 | 1/2001 | Kawakami et al. | |
| 6,175,587 B1 | 1/2001 | Madhow et al. | |
| 6,192,067 B1 | 2/2001 | Toda et al. | |
| 6,201,799 B1 | 3/2001 | Huang et al. | |
| 6,215,812 B1 | 4/2001 | Young et al. | |
| 6,219,376 B1 | 4/2001 | Zhodzishsky et al. | |
| 6,222,828 B1 | 4/2001 | Ohlson et al. | |
| 6,230,180 B1 | 5/2001 | Mohamed | |
| 6,233,229 B1 | 5/2001 | Ranta et al. | |
| 6,233,459 B1 | 5/2001 | Sullivan et al. | |
| 6,240,124 B1 | 5/2001 | Wiedeman et al. | |
| 6,252,535 B1 | 6/2001 | Kober et al. | |
| 6,256,336 B1 | 7/2001 | Rademacher et al. | |
| 6,259,688 B1 | 7/2001 | Schilling et al. | |
| 6,263,208 B1 | 7/2001 | Chang et al. | |
| 6,266,529 B1 | 7/2001 | Chheda | |
| 6,275,186 B1 | 8/2001 | Kong | |
| 6,278,726 B1 | 8/2001 | Mesecher et al. | |
| 6,282,231 B1 | 8/2001 | Norman et al. | |
| 6,282,233 B1 | 8/2001 | Yoshida | |
| 6,285,316 B1 | 9/2001 | Nir et al. | |
| 6,285,319 B1 | 9/2001 | Rose | |
| 6,285,861 B1 | 9/2001 | Bonaccorso et al. | |
| 6,301,289 B1 | 10/2001 | Bejjani et al. | |
| 6,304,618 B1 | 10/2001 | Hafeez et al. | |
| 6,308,072 B1 | 10/2001 | Labedz et al. | |
| 6,310,704 B1 | 10/2001 | Dogan et al. | |
| 6,317,453 B1 | 11/2001 | Chang | |
| 6,321,090 B1 | 11/2001 | Soliman | |
| 6,324,159 B1 | 11/2001 | Mennekens et al. | |
| 6,327,471 B1 | 12/2001 | Song | |
| 6,330,460 B1 | 12/2001 | Wong et al. | |
| 6,333,947 B1 | 12/2001 | van Heeswyk et al. | |
| 6,351,235 B1 | 2/2002 | Stilp | |
| 6,351,642 B1 | 2/2002 | Corbett et al. | |
| 6,359,874 B1 | 3/2002 | Dent | |
| 6,362,760 B2 | 3/2002 | Kober et al. | |
| 6,377,636 B1 | 4/2002 | Paulraj et al. | |
| 6,380,879 B2 | 4/2002 | Kober et al. | |
| 6,396,804 B2 | 5/2002 | Odenwalder | |
| 6,404,760 B1 | 6/2002 | Holtzman et al. | |
| 6,430,216 B1 | 8/2002 | Kober et al. | |
| 6,459,693 B1 | 10/2002 | Park et al. | |
| 6,501,788 B1 | 12/2002 | Wang et al. | |
| 6,584,115 B1 | 6/2003 | Suzuki | |
| 6,590,888 B1 | 7/2003 | Ohshima | |
| 6,661,835 B1 | 12/2003 | Sugimoto et al. | |
| 6,683,924 B1* | 1/2004 | Ottosson et al. | 375/343 |
| 6,975,670 B1* | 12/2005 | Aldaz et al. | 375/144 |
| 7,149,200 B1* | 12/2006 | Vadgama | 370/335 |
| 7,194,051 B2* | 3/2007 | Li et al. | 375/349 |
| 2001/0003443 A1 | 6/2001 | Velazquez et al. | |
| 2001/0020912 A1 | 9/2001 | Naruse et al. | |
| 2001/0021646 A1 | 9/2001 | Antonucci et al. | |
| 2001/0046266 A1 | 11/2001 | Rakib et al. | |
| 2002/0001299 A1 | 1/2002 | Petch et al. | |
| 2002/0051433 A1 | 5/2002 | Affes et al. | |
| 2002/0172173 A1 | 11/2002 | Schilling et al. | |
| 2002/0176488 A1 | 11/2002 | Kober et al. | |
| 2003/0053526 A1 | 3/2003 | Reznik | |
| 2003/0054814 A1* | 3/2003 | Karabinis et al. | 455/427 |
| 2004/0151235 A1* | 8/2004 | Olson et al. | 375/148 |
| 2005/0180364 A1* | 8/2005 | Nagarajan et al. | 370/335 |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 1/1993 |
| EP | 0610989 A2 | 1/1994 |
| GB | 2280575 A | 6/1995 |
| JP | 2000-13360 A | 1/2000 |

| WO | WO 9211722 A1 | 7/1992 |
| WO | WO 93/12590 | 6/1993 |
| WO | WO 9808319 A1 | 2/1998 |
| WO | WO 0044106 A1 | 7/2000 |
| WO | WO 03043239 A1 | 5/2003 |
| WO | WO 03060546 A2 | 7/2003 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice-Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice-Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Sofiene et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1977, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversion by Pulse-Count Modulation Methods, IEEE Transactions on Instrumentation and Measurement, Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue digital converter, Electronic Letters, Dec. 4, 1997, vol. 33, No. 25.

Lin et al., Digital Filters for High Performance Audio Delta-signma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

Scharf, "Matched Subspace Detectors", Signals, Systems and Computers, 1993 Conference Record of the Twenty-seventh Asilomar Conference on Pacific Grove, CA, USA, Nov. 1-3, 1993, Los Alamitos, CA, USA, IEEE Comput. Soc., pp. 701-706.

European Patent Office, Communication dated Jul. 4, 2008 in App. No. 03 770 434.3.

European Patent Office, Communication dated Jan. 13, 2009 in App. No. 03 770 434.3.

European Patent Office, Communication dated Sep. 8, 2009 in App. No. 03 770 434.3.

European Patent Office, Communication dated Jun. 27, 2009 in App. No. 02 776 047.9.

European Patent Office, Communication dated Nov. 30, 2009 in App. No. 02 776 047.9.

* cited by examiner

| CANDIDATE To CANCEL LIST 416 | | | |
|---|---|---|---|
| DEMODULATING FINGER 224 | SIGNAL PATH 1204 | SIGNAL STRENGTH 1208 | SECTOR 1212 |
| 1 | 1 | -5 dB | 1 |
| 2 | 1 | -15 dB | 1 |
| 3 | 2 | -9 dB | 2 |
| 4 | 3 | -12 dB | 1 |

Figure 12

| ToCANCEL LIST 224 | 1304 |
|---|---|
| DEMODULATING FINGER | SIGNAL PATH |
| 1<br>3<br>4 | 1<br>2<br>3 |

| CANCELLED SIGNAL FEED LIST | | |
|---|---|---|
| DEMODULATING FINGER | CANCELLER | CANCELLED PATH |
| 1 | 1 | 2, 3 |
| 2 | 2 | 1, 3 |
| 3 | 3 | 1 |

Figure 15

METHOD AND APPARATUS FOR SELECTIVELY APPLYING INTERFERENCE CANCELLATION IN SPREAD SPECTRUM SYSTEMS

CROSS-REFERENCED TO RELATED APPLICATIONS

This application claims the benefit of U.S. Provisional Application No. 60/412,550, entitled "Controller For Interference Cancellation and Spread Spectrum Systems," filed Sep. 23, 2002, the entire disclosure of which is hereby incorporated by reference.

FIELD OF THE INVENTION

The present invention is directed to the application of interference cancellation in spread spectrum systems. In particular, the present invention is directed to selectively applying interference cancellation such that if interference cancellation has resulted in an improved signal, interference cancellation can be used or continued.

BACKGROUND OF THE INVENTION

Wireless communication systems should provide for a large number of secure (or private) communication channels within their allotted frequency space. In order to achieve these goals, spread spectrum systems have been developed. In a spread spectrum type system, spreading codes are used that allow multiple channels to occupy the same frequency range. In order to successfully demodulate a channel, the spreading code used in connection with the channel must be known. When a demodulation processor is tracking a particular signal path, signal paths associated with other transmitters appear to that processor as noise.

In order to provide for reliable communications, spread spectrum systems typically track multiple signal paths in connection with establishing and maintaining a communication channel between a pair of end points. The different signal paths may result from redundant signals that are provided by additional base stations and base station sectors, or from reflected or multi-path versions of signals. In a typical receiver, a number (e.g. 4 to 6) demodulation processors or fingers are provided, and each of these fingers is assigned to track a different signal path. In order to obtain information regarding the different signal paths that are available to a receiver, a searcher demodulation processor or finger is provided. In a typical receiver, the searcher finger detects and identifies signals by pseudorandom number (PN) code offsets and signal strength. Because signal paths other than the signal path being tracked appear as noise to a demodulation processor, the signal to noise ratio with respect to a tracked or desired signal path can be low, which can result in a communication channel with poor quality and reliability. In particular, signals from sources that are in close proximity to the receiver can drown out signals from sources that are farther away from the receiver. Accordingly, because of this "near-far" problem, signal diversity is limited. In addition to leaving communication channels more vulnerable to interruption, relatively weak signals that might otherwise be available to a receiver lie beneath the noise floor created in the environment by other relatively strong signals. This limitation in acquiring and tracking signals from distant sources caused by the near-far problem also limits the effectiveness of location schemes that rely on triangulation techniques.

In order to address the near-far problem, schemes have been developed for controlling the power of signals produced by sources, e.g. beam steering and smart antenna application. However, such schemes may be complex and difficult to implement. In addition, where sources such as base stations are in communication with a large number of receivers, some of which are close to the source and others of which are far from the source, the limitation of signal power may not be feasible.

Another approach to allowing receivers to effectively track signals subject to near-far interference has been to apply interference cancellation. Such systems remove signal paths that are extraneous from the signal path being tracked in a demodulation finger. However, such systems have not provided for the flexible application of such cancellation. As a result, the use of conventional interference cancellation schemes, as they have heretofore been applied, can actually result in poorer signal to noise ratios with respect to desired signal paths than if no interference cancellation had been applied.

SUMMARY OF THE INVENTION

The present invention is directed to solving these and other problems and disadvantages of the prior art. According to the present invention, a method and apparatus for selectively applying interference cancellation to signals is provided. For example, the present invention may apply interference cancellation only if such cancellation results in an improvement in the strength of desired signal paths. Embodiments of the present invention also allow for the selection of an interference cancellation scheme that is determined to be preferred over other interference cancellation schemes or over an arrangement in which only non-interference cancelled signals are provided to demodulation processors or fingers.

According to embodiments of the present invention, the strength of each of a number of signal paths or identified signals at a receiver is determined, and one or more signal paths that are stronger than other signal paths are identified or determined to contribute a greater amount of interference. According to further embodiments of the present invention, signal paths that are not necessarily the strongest but that negatively affect another signal path are identified. Cancellation of signal paths identified as having a high strength or that negatively affect another signal path or paths from signal streams (i.e. raw or interference cancelled received streams) within a receiver may be initiated by providing an estimate of a signal path being considered for cancellation to a signal cancellation module. An estimate of the signal path may be prepared by a channel determination module for the signal cancellation module. The signal cancellation module removes the estimate of the strong potentially interfering signal path from another signal stream or signal streams (i.e., from one or more signal streams that may be provided to demodulation fingers assigned to track signal paths other than the signal path being cancelled). The cancellation controller then determines whether the signal to noise ratio of the signal path or paths derived from the signal stream or streams from which the potential interferer have been removed have increased. If an increase in the signal to noise ratio of a desired signal path is detected, the potential interferer is identified as an actual interferer, and the interference canceled version of the desired signal stream may be provided to the demodulation finger assigned to that desired signal path.

If an increase in the signal to noise ratio of a desired signal path is not detected, the interference canceled signal stream will not be provided to a demodulation finger assigned to that desired signal path. In accordance with another embodiment of the present invention, an interference canceled signal stream is not provided to a demodulation finger assigned to a desired signal path unless it has been determined that the interference canceled signal stream will likely result in an increase in the strength of the desired signal by at least a threshold amount. In accordance with embodiments of the present invention, the analysis of the effect of providing different interference canceled signals to demodulation fingers can proceed such that either the raw signal stream or an interference canceled signal stream is identified as providing the greatest signal strength with respect to a desired signal path. This can be done for each signal path assigned to a demodulating finger provided by a receiver. In accordance with another embodiment of the present invention, signal cancellation may be achieved using various methods. For example, a replica of the potential interferer or identified interferer may be subtracted from the raw signal stream. In accordance with another embodiment of the present invention, serial cancellation techniques using projection-based methods of removing potential interferers or identified interferers may be used. In accordance with still other embodiments of the present invention, parallel cancellation of potential interferers and identified interferers may be applied.

BRIEF DESCRIPTION OF THE DRAWINGS

FIG. 12 illustrates the contents of a candidate to cancel list in accordance with an embodiment of the present invention;

FIG. 13 illustrates the contents of a to cancel list in accordance with an embodiment of the present invention;

FIG. 15 illustrates the contents of a canceled signal feed list in accordance with an embodiment of the present invention.

DETAILED DESCRIPTION

Figure 1:
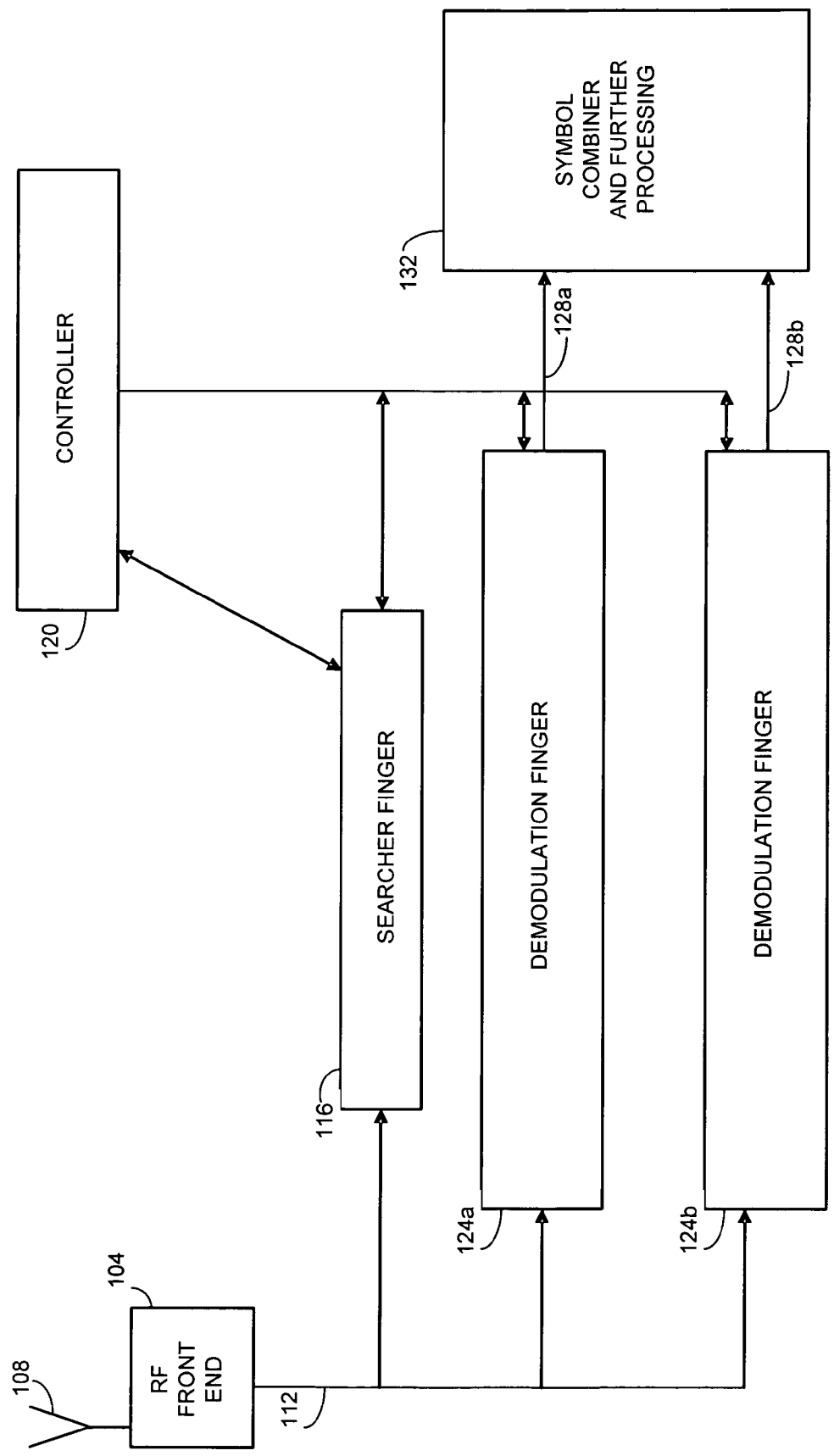
FIG. 1 is a block diagram depicting components of a spread spectrum receiver in accordance with the prior art.

With reference now to FIG. 1, components of a baseline or prior art spread spectrum communication receiver 100 are illustrated. As depicted in FIG. 1, signals are provided to a radio frequency front end 104 by an antenna 108. In a typical environment, a number of different signals, for example, signals produced by different base stations, different sectors of a base station, or multi-path or reflected versions of the signals can be received at the radio frequency front end 104. As can be appreciated by one of skill in the art, signals from different base stations or different sectors of a base station are typically identified by an associated path number, which identifies the base station or base station and sector according to the time offset of the signal path. Multi-path versions of signals are identified by the path number of the line of sight version of the signal, plus an additional time offset to account for the longer path followed by the reflected signal. As can further be appreciated by one of skill in the art, signal paths from different sources are typically separated by a distance (e.g., 64 chips) sufficient to allow the source of multi-path versions of signal paths to be correctly identified with the source of such signal paths.

The raw signal stream 112 collected by the receiver 100 and down-converted by the RF front end 104 is provided to a searcher finger 116. The searcher finger functions to scan the signal stream 112 for individually identifiable signal paths and/or multi-paths. In particular, the searcher finger 116 operates to determine the path number or pseudorandom number (PN) code offset associated with each identifiable signal path. As noted above, the PN code identifies this signal path as being associated with a particular base station or base station sector. In code division multiple access (CDMA) systems, the PN code sequence is referred to as the short code.

The searcher finger 116 reports the signal paths that have been identified to the controller 120. Information provided to the controller may be placed in a survey path list. In general, the survey path list identifies by PN offsets those signal paths that are visible to the searcher finger 116. Alternatively, the survey path list may contain the PN offsets for those signal paths that have at least a threshold signal to noise ratio or strength.

The controller 120 reports the identities of the signal paths to the survey path list. From the survey path list, the controller 120 may decide to acquire and track one or more of the signal paths on the survey path list. In general, the number of signal paths that a receiver 100 can be directed to track is limited by the number of demodulation fingers 124 provided as part of the receiver 100. The signal paths assigned to the receiver 100 for demodulation and tracking may be provided as a demodulation path list. In a typical communication system, the demodulation path list comprises an identifier for each demodulation finger 124, an identifier of the signal path assigned to each demodulation finger 124, any additional time offset, the observed strength of the signal and the sector of the signal path.

The demodulation fingers 124 receive as a feed signal the raw signal stream 112 from the radio frequency front end 104, and each acquires the signal path assigned to that finger 124, as set forth in the demodulation path list. The demodulated signal stream is then provided to a symbol combiner 132, which combines the demodulated signal streams 128 provided by the demodulation fingers 124. For example, the signal combiner 132 and the demodulation fingers 124 collectively comprise a rake receiver. Although the receiver 100 depicted in FIG. 1 illustrates first 124*a* and second 124*b* demodulation fingers, and associated first 128*a* and second 128*b* demodulated signals, receivers 100 having varying numbers of demodulation fingers 124 have been developed. For example, commercially available CDMA telephones commonly have from 4 to 6 demodulation fingers 124.

The prior art receiver 100 illustrated in FIG. 1 does not include an interference canceller for providing an interference canceled signal stream to the demodulation fingers 124. Receivers 100 that provide signal cancellation have been developed. However, such systems have not provided for selective application of interference cancellation. Accordingly, such systems have applied signal cancellation without regard to whether such cancellation actually results in improvements to the signal strengths of desired signal paths. Accordingly, such systems can actually reduce the observed signal strength of desired signal paths.

Figure 2:
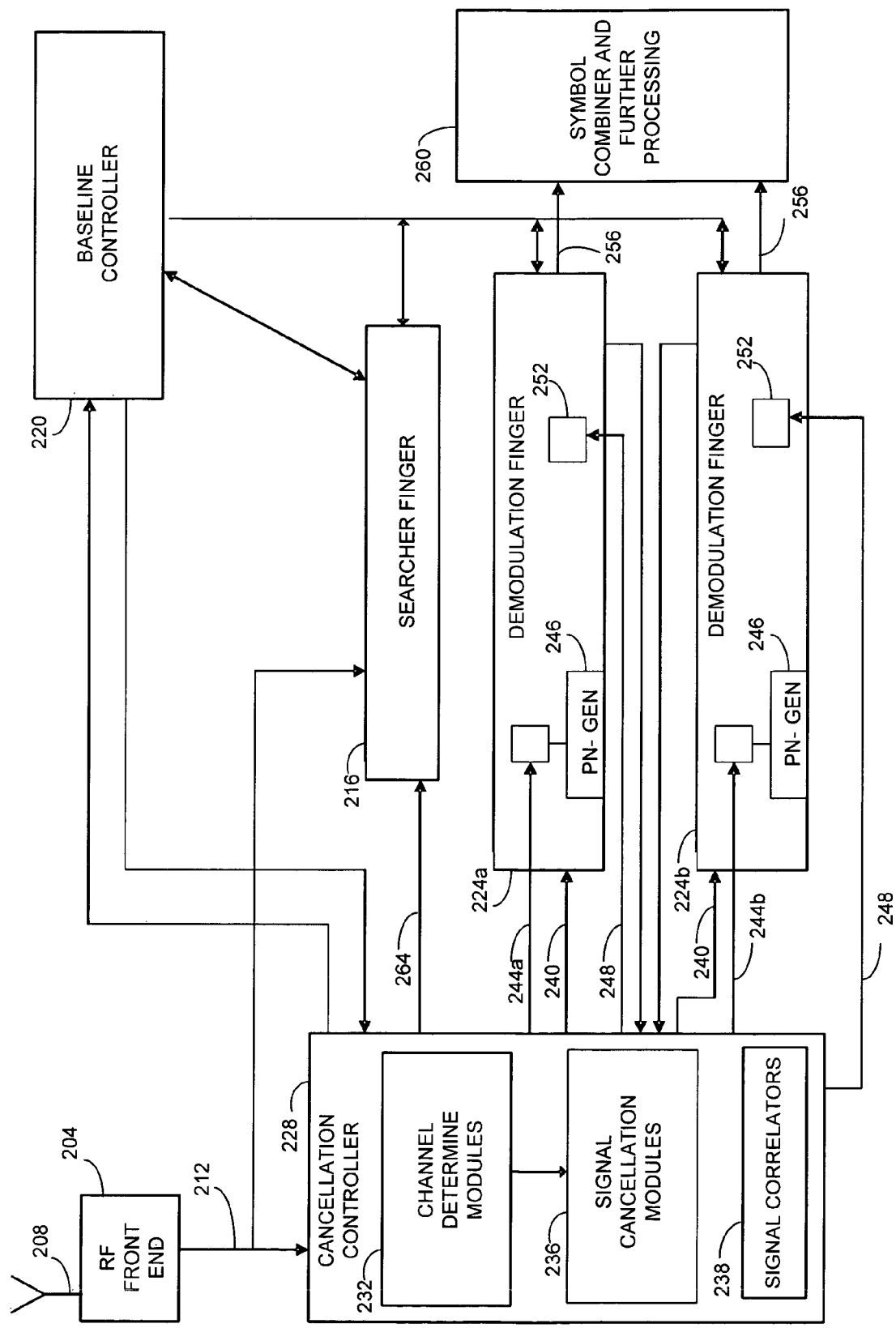
FIG. 2 is a block diagram of components of a spread spectrum receiver in accordance with an embodiment of the present invention.

With reference now to FIG. 2, a cancellation controlled receiver 200 in accordance with an embodiment of the present invention is illustrated. In general, the receiver 200 provides for the selective application of interference cancellation. For example, a receiver 200 in accordance with the present invention is capable of determining whether an interference canceled signal stream will improve the observed strength of a desired signal path in the receiver 200. Furthermore, such a determination can be made before an interference canceled signal stream is provided to a demodulation finger. In addition, the receiver 200 can provide a different interference canceled signal stream, or a signal stream that has not undergone interference cancellation, if it is determined that a previously selected interference canceled signal stream is no longer resulting in an improved signal to noise ratio with respect to a desired signal path.

In general, the receiver 200 includes a radio frequency (RF) front end 204 and associated antenna 208. The raw signal stream 212 collected by the RF front end 204 and antenna 208 is provided to a searcher finger 216. The searcher finger 216 may operate to locate signals within the raw signal stream 212. The identity of the signal paths located by the searcher finger may then be reported to a baseline controller 220. In particular, information regarding signal paths located by the searcher finger 216 may be used to construct a survey path list. The baseline controller 220 assigns the receiver 200 to track all or a selected set of the signal paths identified in the survey path list. The assignment of signal paths that are to be acquired and tracked by demodulation fingers 224 in the receiver 200 may be performed in association with a demodulation path list. In FIG. 2, only two demodulation fingers 224*a* and 224*b* are shown. However, it should be appreciated that any number of additional demodulation fingers 224 may be provided.

As shown in FIG. 2, the baseline controller 220 may be in communication with a cancellation controller 228. The cancellation controller 228 is unique to the present invention. In general, and as will be described in greater detail elsewhere herein, the cancellation controller 228 controls the production and selection of interference canceled signals. As part of the selection process, the cancellation controller 228 is capable of determining that interference canceled signal streams available to the receiver 200 do not result in improving the signal to noise ratio of a desired signal path, and may therefore direct the provision of the raw signal stream 212 as a feed signal stream to all or some of the demodulation fingers 224.

As shown in FIG. 2, the cancellation controller 228 may include one or more channel determination modules 232 and one or more signal cancellation modules 236. In general, the channel determination modules 232 operate to produce replicas of signal paths that are identified by the cancellation controller 228 as being potential or actual interferer signal paths. The signal cancellation modules 236 receive the replica signal paths, and perform cancellation to remove such signals from the raw signal stream 212. The cancellation controller may also include one or more correlators 238 for determining whether interference canceled signal streams produced in the signal cancellation modules 236 provide a desired signal path having an increased strength.

In order to provide either the raw (or baseline) signal stream or an interference canceled signal stream to a demodulation finger 224, a signal line 244*a* and 244*b* for carrying the signal stream is provided between the cancellation controller 228 and the corresponding demodulation fingers 224*a* and 224*b*. In addition, control signal paths 240 are provided between the cancellation controller and the demodulation fingers 224 to control the delay or advance of the PN codes by the PN generator 246 associated with each demodulation finger 224. The ability to delay or advance the PN generators 246 associated with the demodulation fingers 224 is advantageous because it allows the demodulation fingers 224 to each track a provided feed signal stream 244, even if that feed signal stream 244 has undergone delays, for example in processing in the cancellation controller 228. The cancellation controller 228 may also provide a demodulated signal delay control signal 248 to a delay buffer 252 to control an amount of delay introduced by each demodulation finger 224 before a symbol obtained from the provided signal stream 244 is made available to a symbol combiner 260. By so controlling the delay within the demodulation fingers 224, demodulated signal streams 256 can be synchronized by the cancellation controller 228. Accordingly, a conventional symbol combiner 260 may be used. Alternatively, a symbol combiner 260 that is capable of synchronizing symbols obtained from the processing of signal streams 244 by the demodulation fingers 224 may be used, in which case the delay buffers 252 and associated signal lines could be omitted. As yet another alternative, the cancellation controller 228 may provide feed signal streams to demodulating fingers 224 after a fixed delay with respect to the raw signal stream 212 as it is received in the RF front end 204 so a conventional combiner 260 may be used.

In accordance with an embodiment of the present invention, the receiver 200 may also provide an interference canceled signal connection 264 capable of delivering an interference canceled signal stream from the cancellation controller 228 to the searcher finger 216. Such an embodiment allows the searcher finger 216 to scan interference canceled versions of the raw signal stream 212 for available signal paths. Accordingly, signal paths that may have been buried beneath the noise floor in a raw signal stream 212 may become visible to the searcher finger 216 in an interference canceled signal stream. Accordingly, a greater number of signal paths can be made available to the receiver 200 for acquisition and tracking by the provided demodulation fingers 224, which can increase the reliability and quality of a communication channel. In addition, by potentially making signal paths originating at additional base stations visible to the receiver 200, location technologies that utilize triangulation techniques between different signal sources and the receiver 200 can provide a more accurate location determination.

In connection with an embodiment in which the searcher finger 216 may be directed to scan interference canceled signal streams, the cancellation controller 228 may operate to provide PN code delay information to the searcher finger 216.

Such information allows the searcher finger 216 to accurately identify the PN of signal paths, even though the feed signal streams will have been delayed by the process of creating the interference canceled signal stream.

Figure 3:
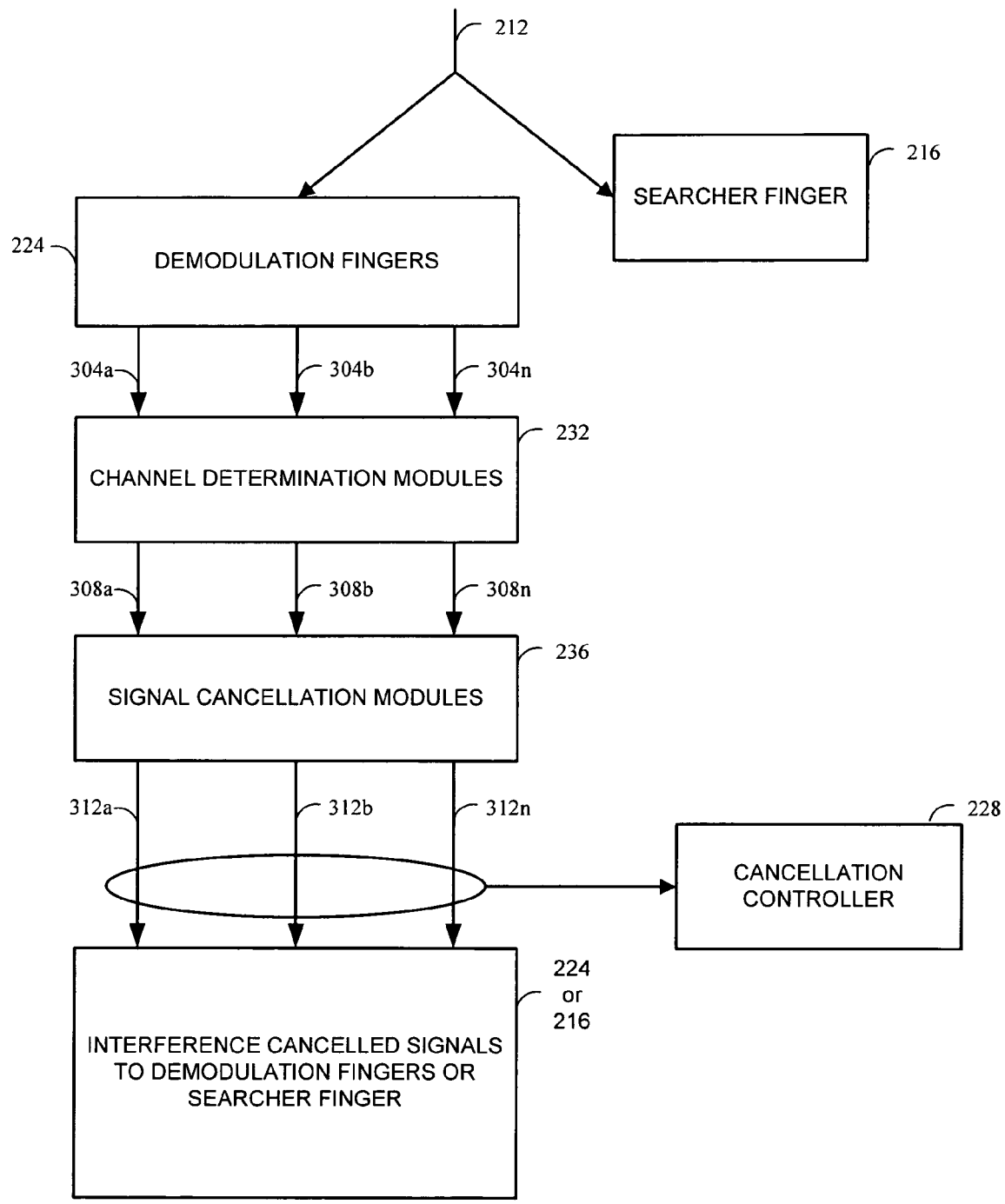
FIG. 3 is a diagram depicting the flow of signals through a spread spectrum receiver in accordance with an embodiment of the present invention.

With reference now to FIG. 3, signal flows within a receiver 200 in accordance with an embodiment of the present invention are illustrated. As shown in FIG. 3, the flow of signal streams through the receiver 200 begins with the receipt of the raw data signal stream 212. The raw signal stream is provided to the searcher finger 216, and also to the demodulation fingers 224. The demodulation fingers 224 each produce a demodulated signal stream 304. In FIG. 3, three demodulated signal streams 304a, 304b and 304n are depicted. Accordingly, FIG. 3 would correspond to a receiver 200 having at least three demodulation fingers 224. As can be appreciated by one of skill in the art, the depiction of three demodulated signal streams 304 is representative. In particular, a receiver 200 may produce a greater or lesser number of demodulated signal streams, provided that an appropriate number of demodulation fingers 224 are available.

The demodulated signal streams 304 are provided to the channel determination modules 232 of the cancellation controller 228. As will be described in greater detail elsewhere herein, the channel determination modules 232 produce estimates of potential interfering signals 308. In FIG. 3, estimates 308a, 308b and 308n are shown. Accordingly, an embodiment producing the data flow illustrated in FIG. 3 might have three channel determination modules 232. However, it should be appreciated that the number of channel determination modules 232 is not required to match the number of demodulation fingers 224 provided by a receiver 200.

The estimates of potential interfering signal paths 308 are provided to the signal cancellation modules 236 of the cancellation controller 228. The signal cancellation modules remove the interfering signal paths from one or more of the feed signal streams provided to the demodulation fingers 224. For example, the estimate 308a of the first demodulated signal path 304a may be removed from the signal stream that will be provided to the demodulation finger 224 assigned to track the second signal path and/or the demodulation finger 224 assigned to track the $n^{th}$ signal path. The estimate of the $n^{th}$ signal path may also be removed from either or both of the feed signal streams provided to the demodulation fingers 224 assigned to track the first and second desired signal paths. Likewise, the estimate of the second interfering signal path 308b may be removed from either or both of the signal streams provided to the demodulating fingers 224 assigned to track the first and $n^{th}$ signals path. The cancellation controller 228 then checks the strength of the interference canceled signal path 312a-n for the assigned signal paths. If it is determined that the strength, for example as represented by an observed signal to noise ratio, has increased for an interference canceled signal path, that interference canceled signal stream may be provided to the assigned demodulation finger. If it is determined that the strength of a desired signal path has not been increased through the use of an interference canceled feed signal stream, the interference canceled signal stream 312 under consideration is not sent to the demodulating finger 224 assigned to track the signal path under consideration. Instead, another signal stream, such as the raw signal stream 212, or a previous version of an interference canceled signal stream 312 having a different signal or set of signals cancelled therefrom, may be provided as the feed signal stream to the demodulating finger 224.

Figure 4:
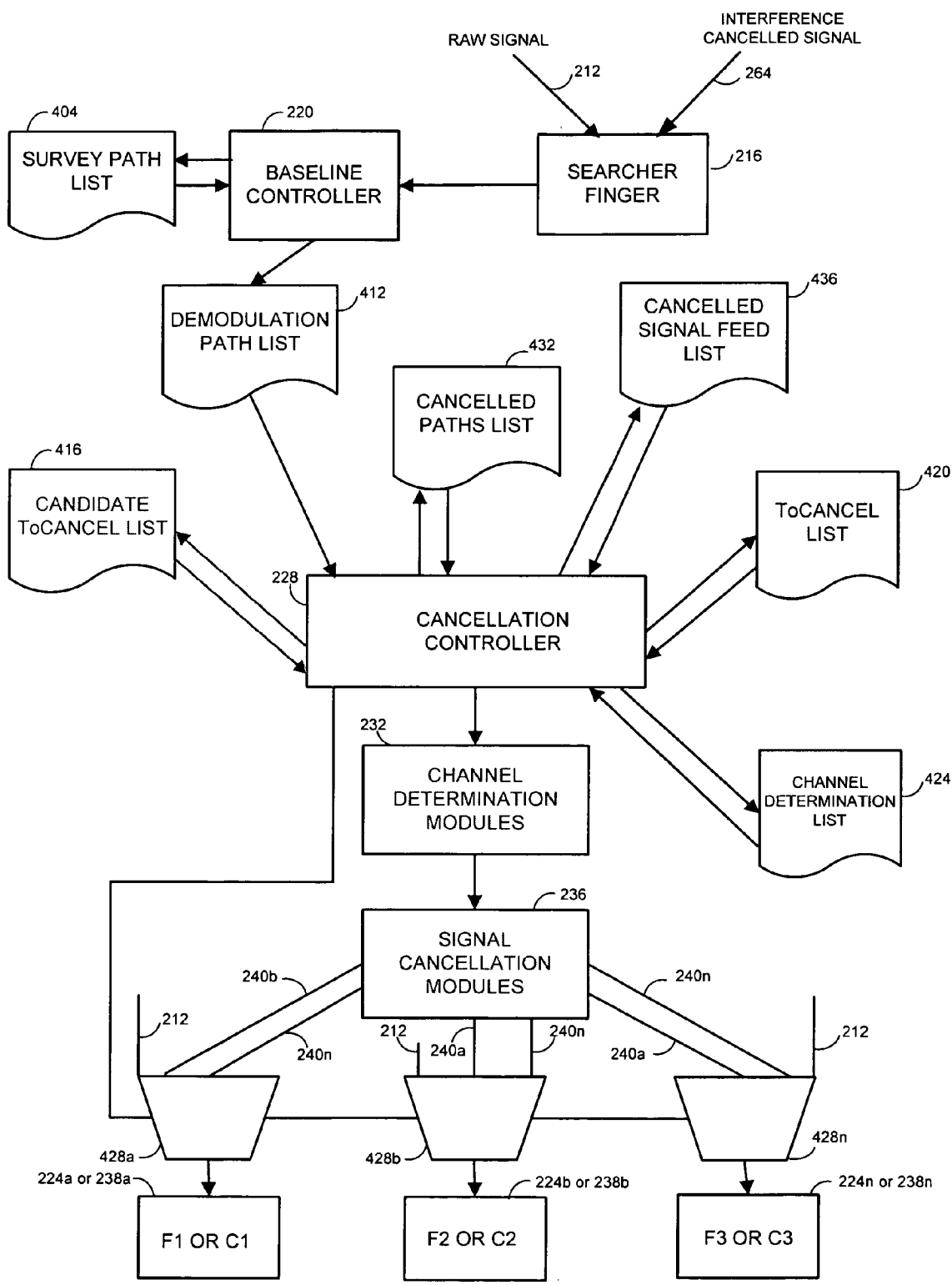
FIG. 4 is a schematic depiction of signal and information flows through a spread spectrum receiver in accordance with an embodiment of the present invention.

With reference now to FIG. 4, the flow of signal streams through a receiver 200 in accordance with an embodiment of the present invention, showing the use of various lists or tables and their relationship to functional elements, is illustrated. Initially, a raw signal stream 212 is provided as a feed signal stream to the searcher finger 216. The searcher finger scans the raw data signal stream 212 to locate and identify signal paths available to the receiver 200. As shown in FIG. 4, an interference canceled signal stream 264 may, in accordance with some embodiments of the present invention, be provided in addition or as an alternative to the raw data signal stream 212. As noted above, the searcher finger 216 provides the information identifying the available signal paths to the baseline controller 220. The baseline controller 220 uses the information provided by the searcher finger 216 to prepare a survey path list 404. The survey path list generally includes the PN offsets of signals located by the searcher finger 216. The baseline controller 220 uses the information from the survey path list to assign signal paths to be tracked by the receiver 200 in available fingers. These assignments are recorded in the demodulation path list 412. Accordingly, the demodulation path list 412 may identify the fingers available in the receiver 200, the signal path assigned to each finger, any time offset, the signal strength of each signal path, and the sector of the signal path. The demodulation path list 412 is then made available to the cancellation controller 228.

The cancellation controller 228 checks for the presence of interfering signal paths in the demodulation path list 412. For example, in accordance with an embodiment of the present invention, the cancellation controller 228 may check for signal paths being tracked by a demodulation finger 224, and that therefore are listed in the demodulation path list 412, that have a signal strength that is greater than a predetermined threshold. The strength of the signal paths may be determined by measuring the signal to noise ratio of the signal path, or a selected component or channel of the signal path. For example, in accordance with an embodiment of the present invention, the strength of the pilot channel signal transmitted by a base station may be measured to determine the strength of the signal paths. In accordance with another embodiment of the present invention, some or all of the traffic channels, the pilot channel, the paging channel, and/or the synchronization channel may be used to determine the strength of a signal path. As can be appreciated by one of skill in the art, greater accuracy in measuring the strength of a signal path can be realized if all or a significant number of the channels or signals within a signal path are measured. However, monitoring a large number of the channels and/or signals within a signal path is computationally expensive. Accordingly, embodiments of the present invention can monitor a relatively small number of the channels or signals within a signal path. For instance, the strength of the pilot signal alone may be measured to determine the strength of the associated signal path. For example, estimates of signal strengths can be determined from the $E_c/I_o$, where $E_c$ is energy per chip and $I_o$ is the total power or interference in the system, can be used to provide a signal to noise ratio value for estimating the strength of the signal path.

Signal paths meeting the criteria for a potential interfering signal path are identified in a candidate to cancel list or table 416. With reference now to FIG. 12, the elements of an exemplary candidate to cancel list 416 are illustrated. As shown in FIG. 12, the candidate to cancel list 416 may include entries identifying demodulating fingers 224, the signal paths 1204 assigned to each demodulating finger 224, the signal strength 1208 of the signal path, and the sector 1212 of the signal path. As can be appreciated by one of skill in the art, each signal path may comprise or reference a different PN code offset or multipath version of a PN code offset.

Figure 13:
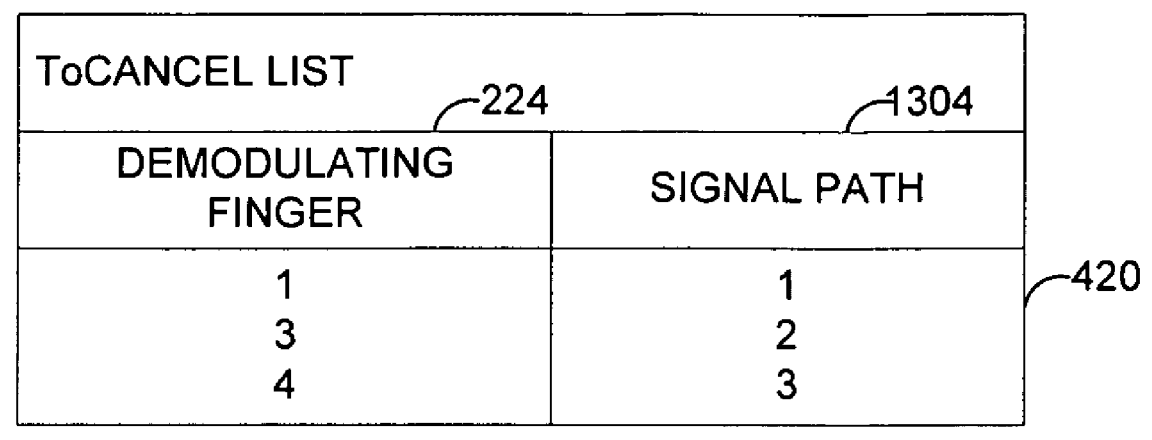

The strongest signal paths included in the candidate to cancel list 416 are assigned to a to cancel list or table 420. As illustrated in FIG. 13, in accordance with an embodiment of the present invention, the to cancel list 420 contains a maximum of n signal paths, where n corresponds to the number of channel determination modules 232 provided by the cancellation controller 228. Accordingly, where the number of potential interfering signal paths exceeds the number of channel determination modules 232, the to cancel list 416 may include the n strongest potential interfering signal paths. With reference now to FIG. 13, the contents of a to cancel list in accordance with an embodiment of the present invention is illustrated. In general, the to cancel list 420 includes an entry for a demodulating finger 224 and a corresponding signal path 1304. In particular, the to cancel list 420 identifies signal paths that are to be canceled.

With continued reference to FIG. 4, using the information included in the to cancel list 420, the cancellation controller 228 operates the channel determination modules 232 to provide outputs from one or more of the demodulation fingers 224 to the appropriate channel determination module or modules 232. Optionally, the information regarding the pairings of the output from demodulation fingers 224 to channel determination modules 232 may be maintained in a channel determination list or table 424, which generally contains the same information as the to cancel list 420. By providing the appropriate signal streams to the channel determination modules 232, interference canceled signal streams are available at the output of the signal cancellation modules 236. The cancellation controller 228 may further implement or control multiplexers 428 for selecting an output available from a signal cancellation module 236 or a raw signal stream 212 to be provided in the receiver 200 as a feed signal stream to a demodulation finger 224 or to a correlator 238 provided as part of the cancellation controller 228. The cancellation controller 228 then determines whether the interference canceled signal streams provided to some or all of the demodulation fingers 224 or correlators 238 has resulted in an improved desired signal strength. In accordance with an embodiment of the present invention, this determination is made by correlating desired signal paths with the raw signal stream 212 and the interference canceled signal stream provided to the corresponding demodulation finger 224. The correlator implemented by the cancellation controller 228 may further comprise a bank of correlators 238.

In accordance with an embodiment of the present invention, a correlator 238 operates by performing a vector inner product or correlation operation: $x^T y$, where x is a reference signal, such as a pilot signal, $^T$ is the transpose operation, and y is a feed signal stream. Therefore, whether the use of an interference cancelled signal $y_1$ results in an improved signal strength can be determined comparing the result of $x^T y_1$ to the result of $x^T y_{raw}$, where $y_{raw}$ is a non-interference cancelled signal stream. The reference signal x, may consists of nothing but a series of 1's and −1's, e.g. the short code or PN sequence. This reference signal may consist of a replica of the pilot channel, which is a non-information bearing channel. The result of the vector inner product can then be used to determine the strength of the correlation between the received signal stream and the PN sequence, because the PN sequence is known. As still another example, signal cancellation could be performed with respect to an interference cancelled version of x and $y_{raw}$. In accordance with still another embodiment of the present invention, a look-up table can be used in place of a correlation operation. In particular, using information regarding the relative signal to noise ratios of a raw signal path and an interference cancelled signal path, previously calculated values stored in a look-up table can be referenced in order to estimate whether it would be preferable to use an interference cancelled signal stream or a non-interference cancelled signal stream.

Figure 14:
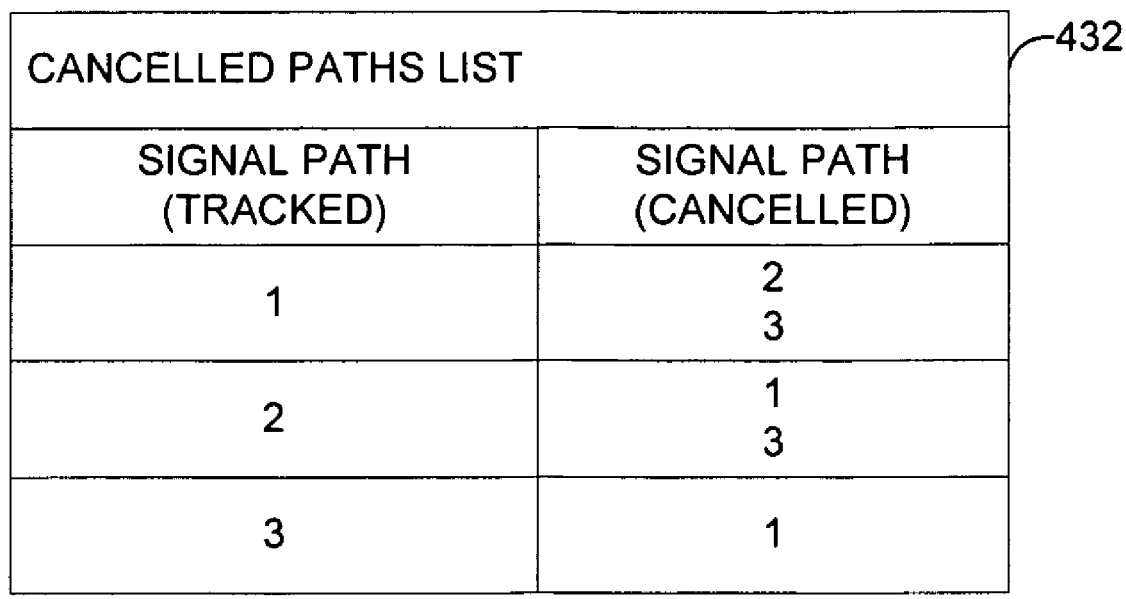
FIG. 14 illustrates the contents of a canceled paths list in accordance with an embodiment of the present invention.

Those signal paths, the cancellation of which resulted in improved signal strengths for a desired signal path, are listed in a canceled paths list or table 432 (FIG. 4). FIG. 14 illustrates the contents of a canceled paths list 432 in accordance with an embodiment of the present invention. As shown in FIG. 14, the canceled paths list 432 may indicate those signal paths that have been canceled from a signal stream provided to a demodulation finger 224. The canceled paths list 432 is then compared to the demodulation path list 412.

If a signal path is present on both the demodulation path list 412 and the canceled paths list 432, a canceled signal feed list or table 436 is updated to indicate that the feed to one or more demodulation fingers 224 comprises an interference canceled signal stream, rather than a raw signal stream. With reference now to FIG. 15, a canceled signal feed list 436 in accordance with an embodiment of the present invention is illustrated. As shown in FIG. 15, the canceled signal feed list may contain a list of demodulation fingers 224. For each demodulation finger 224 in the canceled signal feed list 436, the identity of a signal cancellation module 236 and canceled signal path 1504 may be indicated. If a demodulation finger 224 is not listed in the canceled signal feed list 436 as receiving an interference canceled signal stream, it is provided with the raw signal stream 212.

Figure 5:
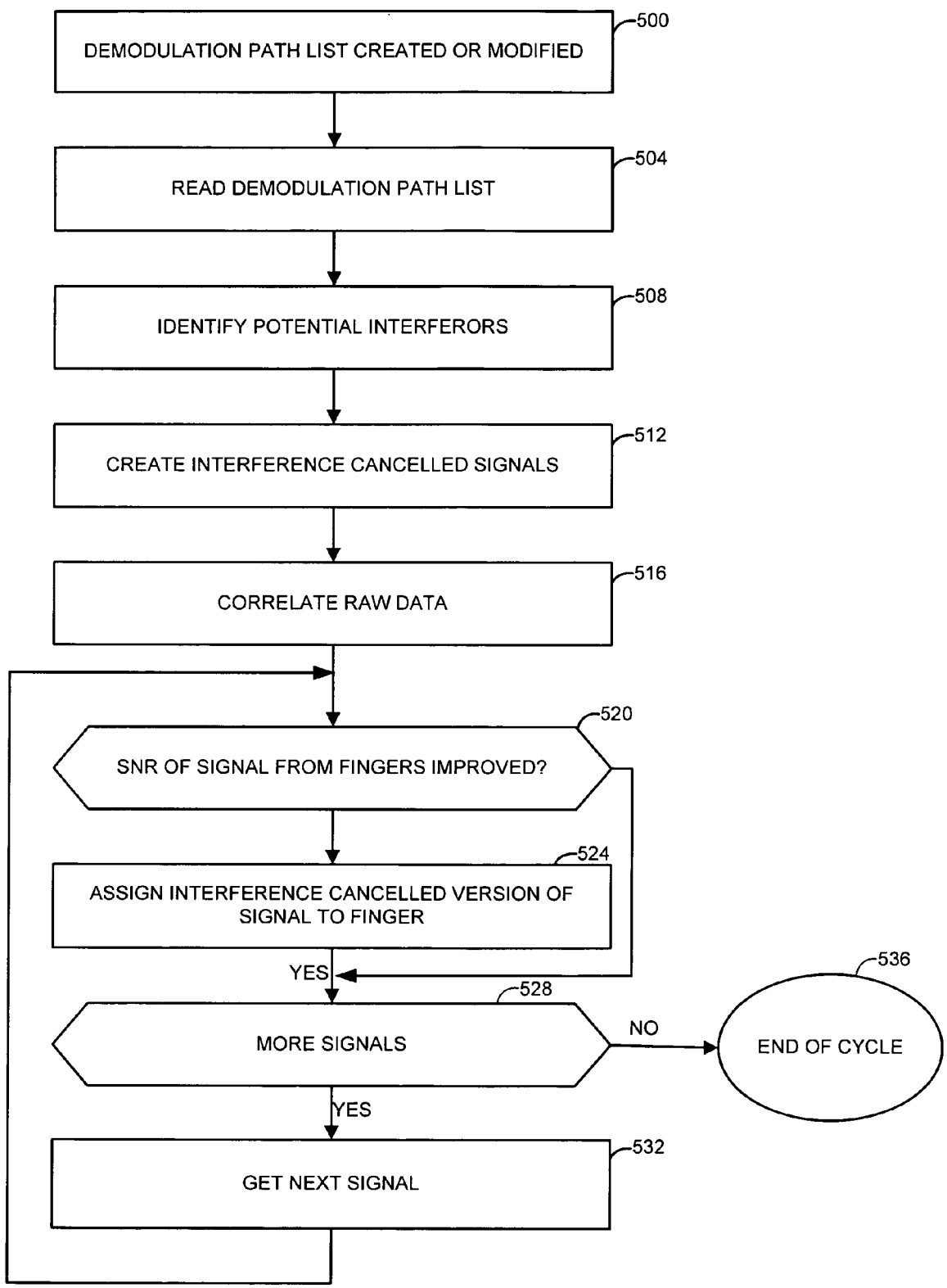
FIG. 5 is a flowchart illustrating aspects of a controller operating cycle in accordance with an embodiment of the present invention.

With reference now to FIG. 5, a channel determination cycle in accordance with an embodiment of the present invention is illustrated. Initially, at step 500, a demodulation path list 412 is created or modified. At step 504, the demodulation path list is read, and at step 508 the strong potential interferers are identified. Next, at step 512, interference canceled signal streams are created. In particular, signal streams from which one or more strong potential interfering signal paths have been removed are created.

At step 516, the interference canceled signal streams are correlated with the reference signal and the raw data signal 212 correlated with the reference signal is computed. A determination is then made as to whether the signal to noise ratio (i.e., the strength) of a desired signal at the output of a corresponding correlator 238 has improved (step 520). If the strength of the desired signal path has improved, the interference canceled version of the input signal stream is provided to the demodulation finger 224 for use in connection with communications involving the receiver 200 (step 524). If the strength of the signal path from the finger 224 has not improved, the interference canceled version of the signal stream is not provided to the finger 224. Instead, the raw signal stream is provided to the finger 224.

At step 528, a determination is made as to whether there are more signal streams to be considered. If signal streams remain to be considered, the next signal is obtained (step 532), and the system returns to step 520. In this way, the effect of providing an interference canceled signal stream to each demodulation finger 224 in a receiver 200 is assessed. If no more signal streams remain to be considered, the channel determination cycle ends (step 536). As can be appreciated by one of skill in the art, the channel determination cycle may start again the next time that the signal paths to be tracked by the demodulating fingers 224 change. For example, the channel determination cycle may start again when the demodulation path list 412 is created or modified.

Figure 6:
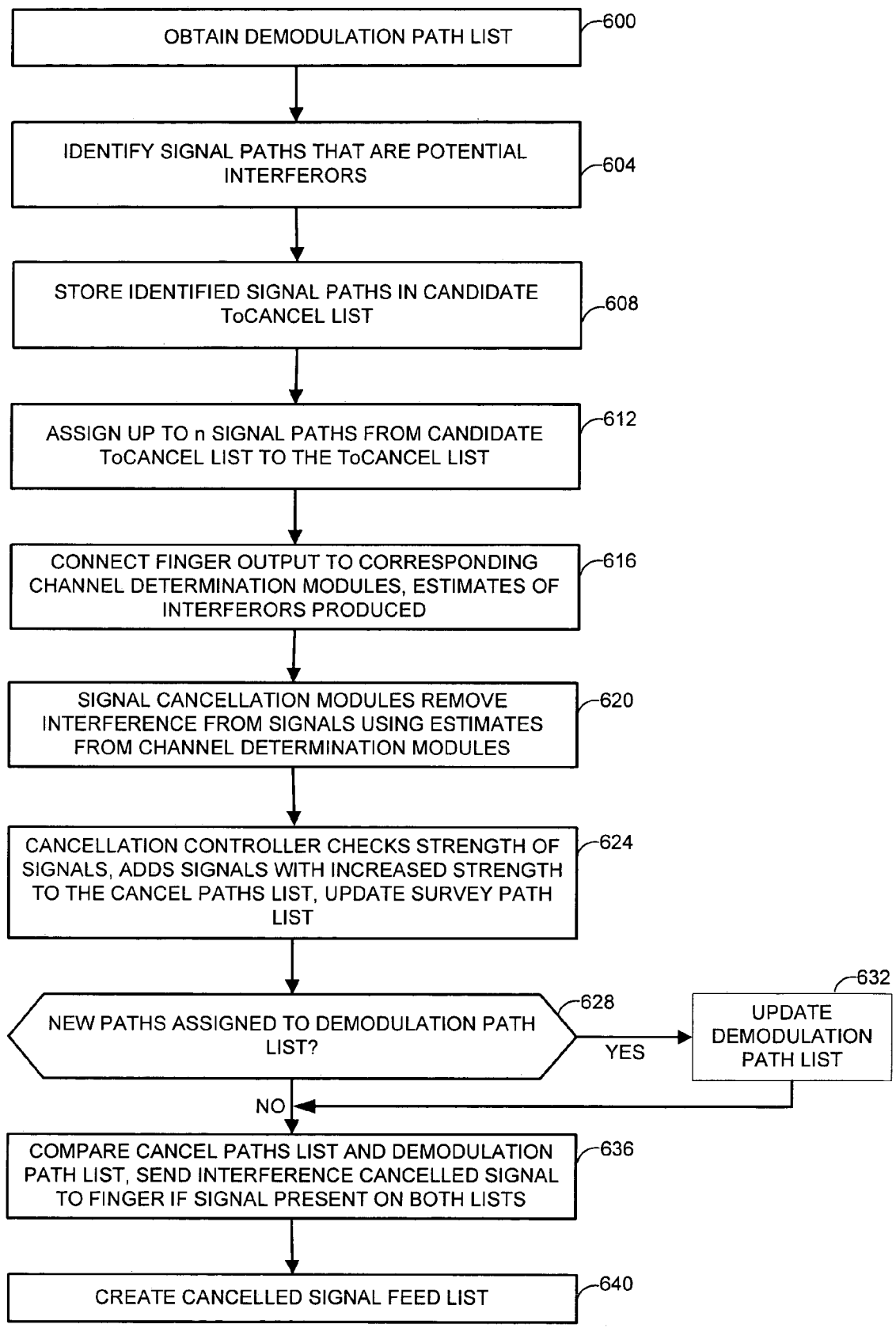
FIG. 6 is a flowchart illustrating aspects of the operation of a spread spectrum receiver in accordance with an embodiment of the present invention.

With reference now to FIG. 6, the operation of a receiver 200 in accordance with an embodiment of the present invention is illustrated in greater detail. As shown in FIG. 6, at step

600 the demodulation path list, listing demodulating fingers 224 and the signal path assigned to each finger, is obtained. At step 604, the signal paths that are potential interferers are identified. For example, in accordance with an embodiment of the present invention, those signals paths having a signal strength that is greater than a predetermined threshold are identified. The identified potentially interfering signal paths are then stored in the candidate to cancel list 416 (step 608). From the candidate to cancel list, up to n signal paths are assigned to the to cancel list 420 (step 612).

At step 616, the output of each demodulation finger 224 is connected to a corresponding channel determination module 232, and estimates of the interfering signal paths are produced. In accordance with an embodiment of the present invention, the estimate of the interfering signal path comprises a replica of that signal path, where the signal cancellation implemented by the signal cancellation modules 236 uses subtractive cancellation. In accordance with another embodiment of the present invention, the estimate of an interfering signal path is expressed as a vector or matrix as described in U.S. patent application Ser. No. 10/294,834, filed Nov. 15, 2002, for use in a serial cancellation interference cancellation design, as described in U.S. patent application Ser. No. 10/247,836, filed Sep. 20, 2002, the entire disclosure of which is incorporated herein by reference, or for use in a parallel type signal cancellation arrangement as described in U.S. patent application Ser. No. 60/445,243, filed Feb. 6, 2003, the entire disclosure of which is also incorporated herein by reference, where a non-orthogonal projection of an interfering signal path is made to cancel the interference. In accordance with another embodiment, in addition or as an alternative to such non-orthogonal projection techniques, orthogonal projection techniques may be used. In general, any suitable noise or signal cancellation technique can be used in connection with the selection process provided in connection with embodiments of the present invention. In accordance with an embodiment of the present invention, the replica of the interfering signal path is produced by monitoring one or more Walsh code channels present in the signal path to be canceled. Accordingly, a signal path identified as an interfering signal path, and therefore a signal path that is to be canceled from other signal streams, must be tracked within at least one of the demodulation fingers 224 in order to build a replica signal. Moreover, by tracking the signal path to be canceled in one of the fingers, correlation can be performed periodically to determine the power of that signal and the amount of interference that it contributes.

At step 620, the signal cancellation modules 236 remove the interfering signal path from a feed signal stream using the estimates from the channel determination modules 232. The cancellation controller 228 then checks the strength of the resulting signal paths, and adds signal paths having increased strength to the canceled paths list 432 (see FIG. 4). As can be appreciated by one of skill in the art, more than one interference canceled stream may provide a benefit to a signal path, in which case a choice must be made between more than one signal streams that provide a benefit. Such choice can be made by ranking the estimated effects of providing the various signal streams. Then, the survey path list 404 may be updated to reflect the new signal strength for the monitored signal paths. Accordingly, a number of different interference cancelled signal streams and the raw signal stream may be evaluated with respect to the reception of one or more signal paths.

At step 628, a determination is made as to whether the demodulation path list 412 has been updated. If new paths have been assigned, the demodulation path list 412 is updated (step 632). If new paths have not been assigned to the demodulation path list, or after updating the demodulation path list 412, the canceled path list 432 and demodulation path list 412 are compared, and the appropriate interference canceled signal stream is sent to the corresponding finger 424 if that signal path is present on both lists (step 636). That is, if a signal path is present on both lists, it is being tracked by a demodulation finger 224, and thus an estimate of that signal path can be prepared, and it has been identified as an interfering signal path with respect to at least one other signal path being tracked within the receiver 200. The canceled signal feed list 436 (see FIG. 4) is then updated to indicate the assignment of interference canceled signal streams to demodulation fingers 224 (step 640).

Figure 7:
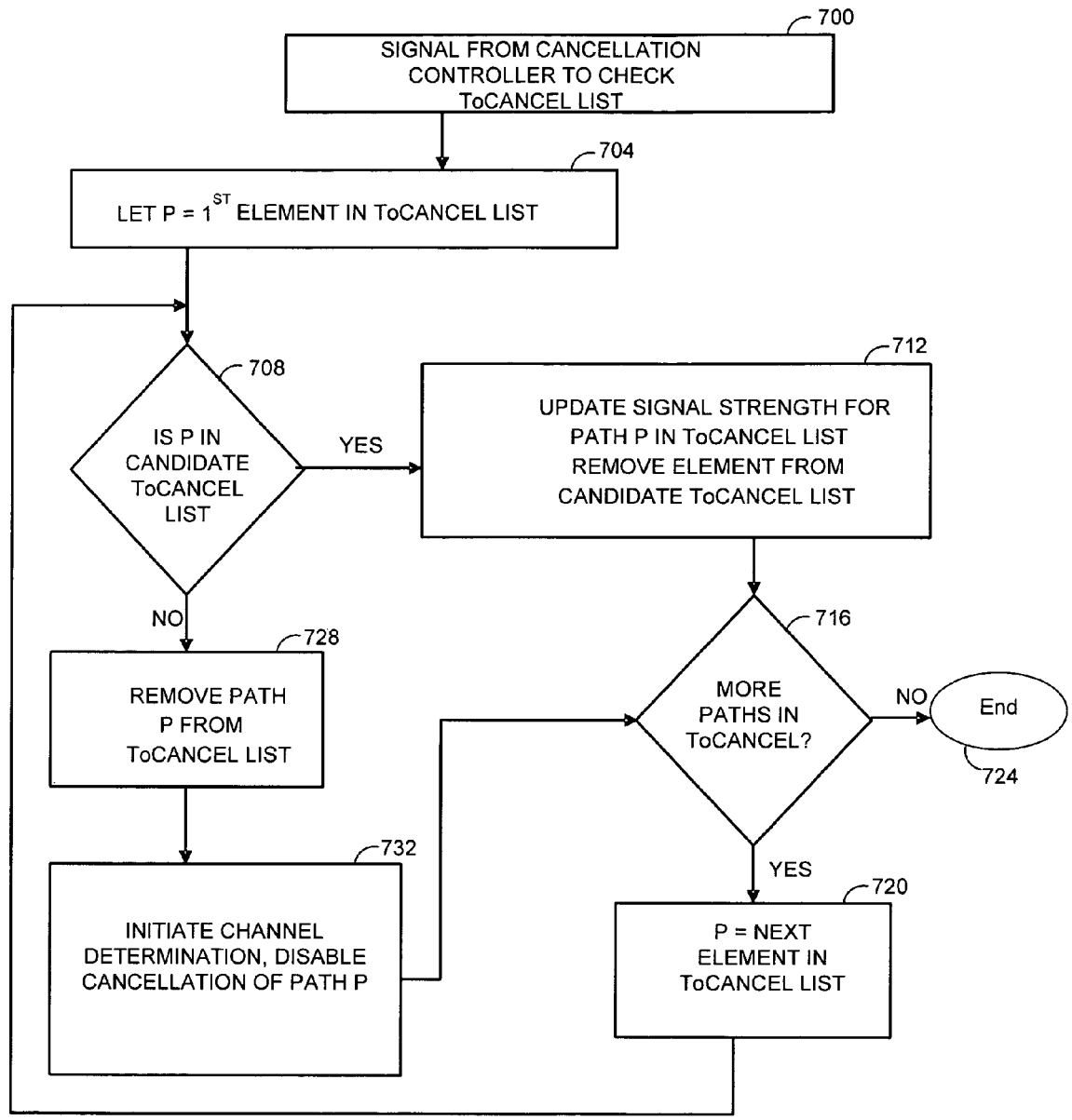
FIG. 7 is a flowchart illustrating a process for updating a to cancel list in accordance with an embodiment of the present invention.

With reference now to FIG. 7, a process for updating a to cancel list 420 in accordance with an embodiment of the present invention is illustrated. Initially, at step 700, the cancellation controller 228 initiates a check of the to cancel list 420. At step 704, a count value p is set equal to the first element (corresponding to a desired signal path) in the to cancel list 420. Next, a determination is made as to whether element p appears in the candidate to cancel list 416 (step 708).

If p appears in the candidate to cancel list 416, the signal strength for path p in the to cancel list 420 is updated, and element p is removed from the candidate to cancel list 416 (step 712). A determination is then made as to whether there are more paths in the to cancel list 420 to be considered (step 716). If there are other paths in the to cancel list 416, p is set equal to the next element in the to cancel list 416 (step 720). If there are no additional paths in the to cancel list 416, the process of updating the cancel list 416 ends (step 724).

If at step 708 it is determined that p is not in the candidate to cancel list 416, path p is removed from the to cancel list 420 (step 728). Channel determination is initiated, and cancellation of path p is disabled (step 732). The process then proceeds to step 716 to determine whether there are more paths in the to cancel list 420 to consider.

Figure 8:
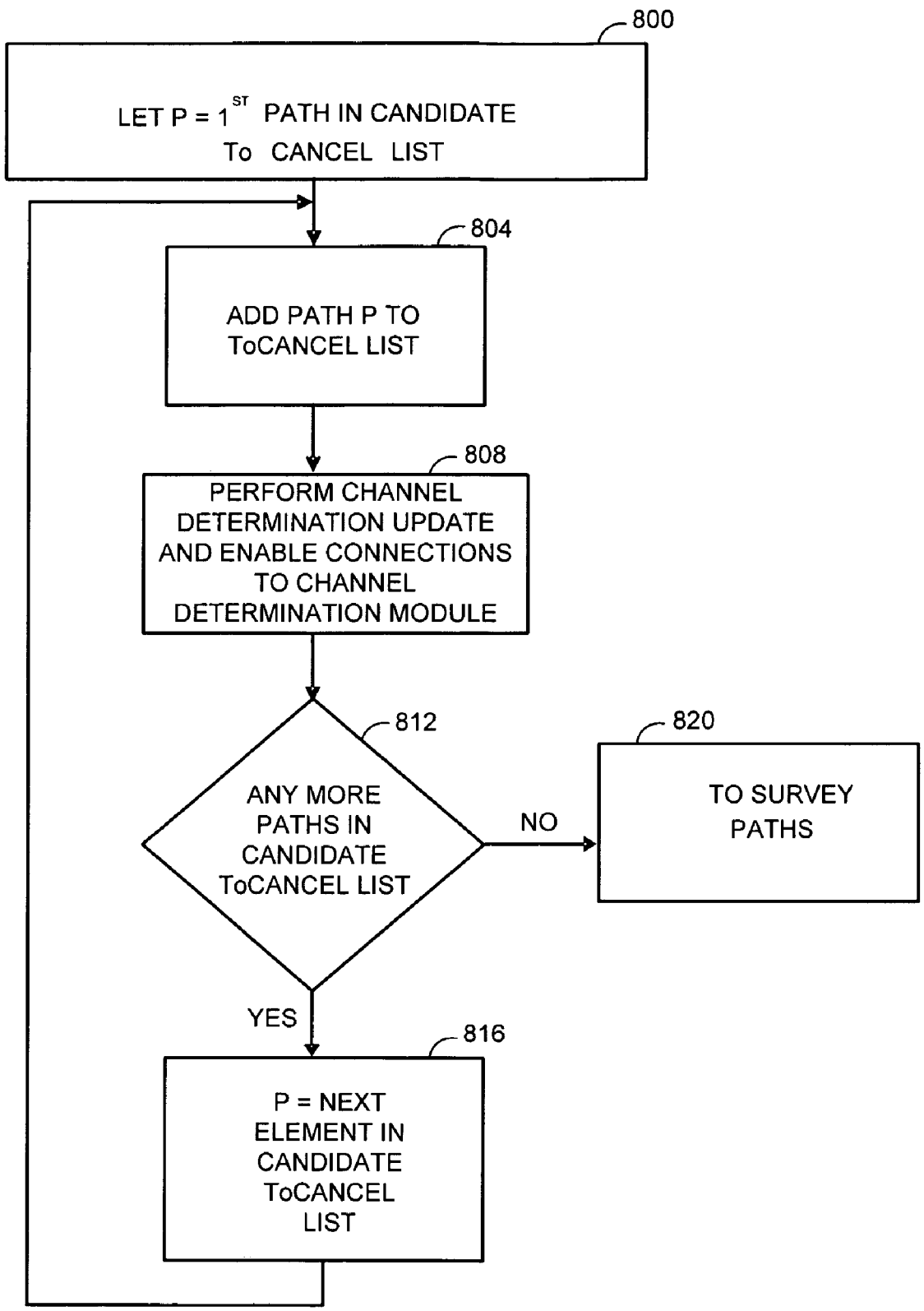
FIG. 8 is a flowchart illustrating a process for adding signal paths to a to cancel list in accordance with an embodiment of the present invention.

With reference now to FIG. 8, a process for adding signal paths to a to cancel list 420 in accordance with an embodiment of the present invention is illustrated. Initially, at step 800, p is set equal to the first path in the candidate to cancel list 416. At step 804, path p is added to the to cancel list 420. An update of channel determination is then performed, and appropriate connections to channel determination modules are enabled (step 808). At step 812, a determination is made as to whether there are additional paths in the candidate to cancel list 416. If there are additional paths, p is set equal to the next element in the candidate to cancel list 416 (step 816) and the process returns to step 804. If there are no additional paths in the candidate to cancel list 416, the process may proceed to update the survey path list 404 (step 820).

Figure 9:
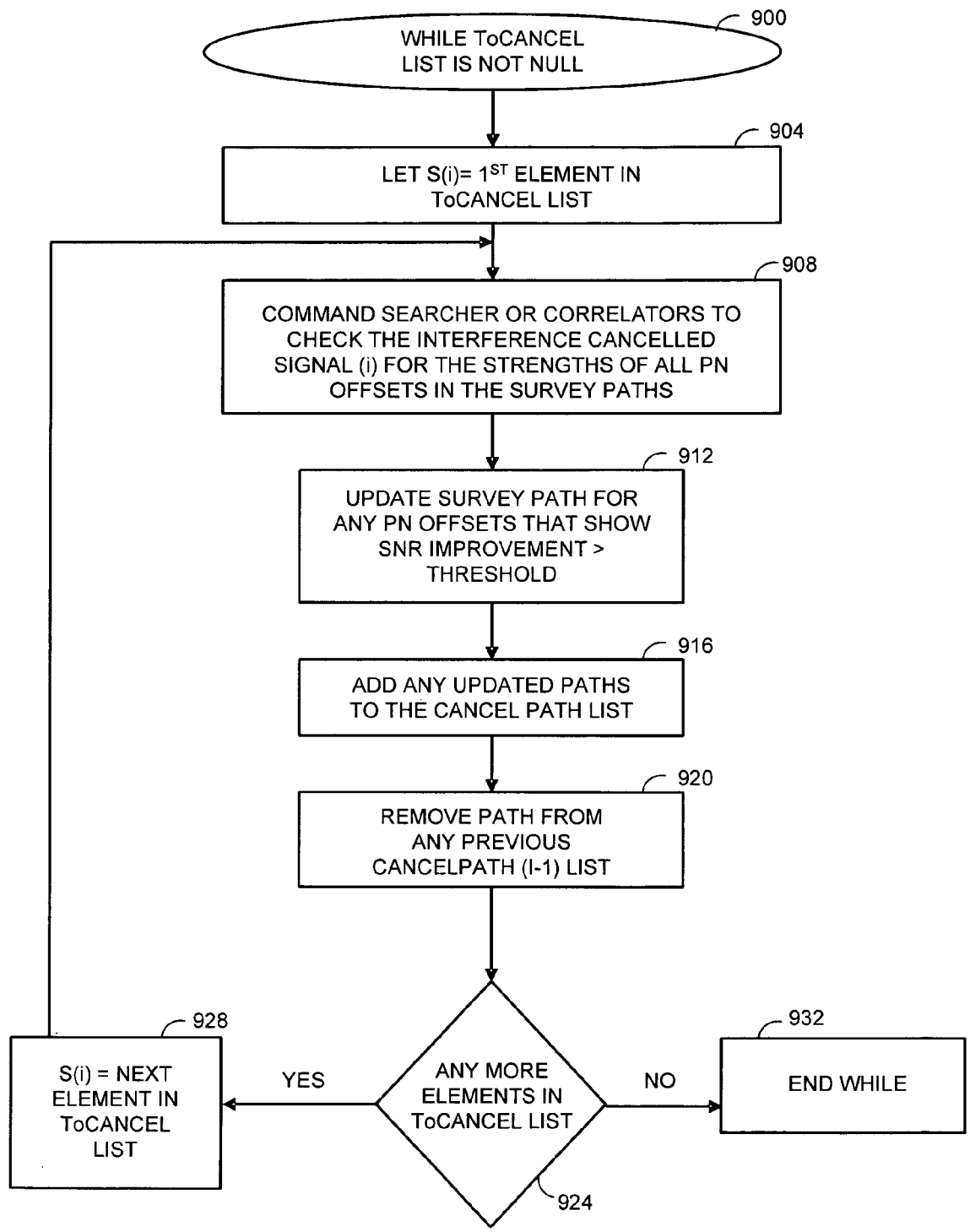
FIG. 9 is a flowchart illustrating a process for updating a survey path list in accordance with an embodiment of the present invention.

With reference now to FIG. 9, a process for updating a survey path and/or cancel path list in accordance with an embodiment of the present invention is illustrated. In general, this process is entered while the to cancel list 420 is not null (i.e., while there are signals listed for cancellation) (step 900). At step 904, s(i) is set equal to the first element in the to cancel list 420. The searcher finger 216 is then commanded to check the interference canceled signal (i) for the strengths of all PN offsets in the survey paths (step 908). Alternatively, the interference cancelled signal is sent to a bank of correlators 238. The survey path list 404 is then updated for any PN offsets that show a signal to noise ratio improvement greater than some threshold amount (step 912). In accordance with an embodiment of the present invention, the survey path list 404 maybe updated for any PN offsets that show any improvement. It should be appreciated that updating the survey path is optional. In particular, the survey path list may be updated if an interference canceled signal stream is sent to the searcher or by some other means. However, updating the survey path list is not necessary in other circumstances for a cancellation controller in accordance with embodiments of the present invention to work.

At step 916, any updated paths are added to the canceled path list 432. Such paths are then removed from any previous canceled path (i−1) list (step 920). A determination is then made as to whether there are additional elements in the to cancel list 420. If elements remain in the to cancel list 420, s(i) is set equal to the next element in the to cancel list 420, and the process returns to step 908. If there are no more elements in the to cancel list 420, the process for updating the survey path list 404 ends (step 932).

Figure 10:
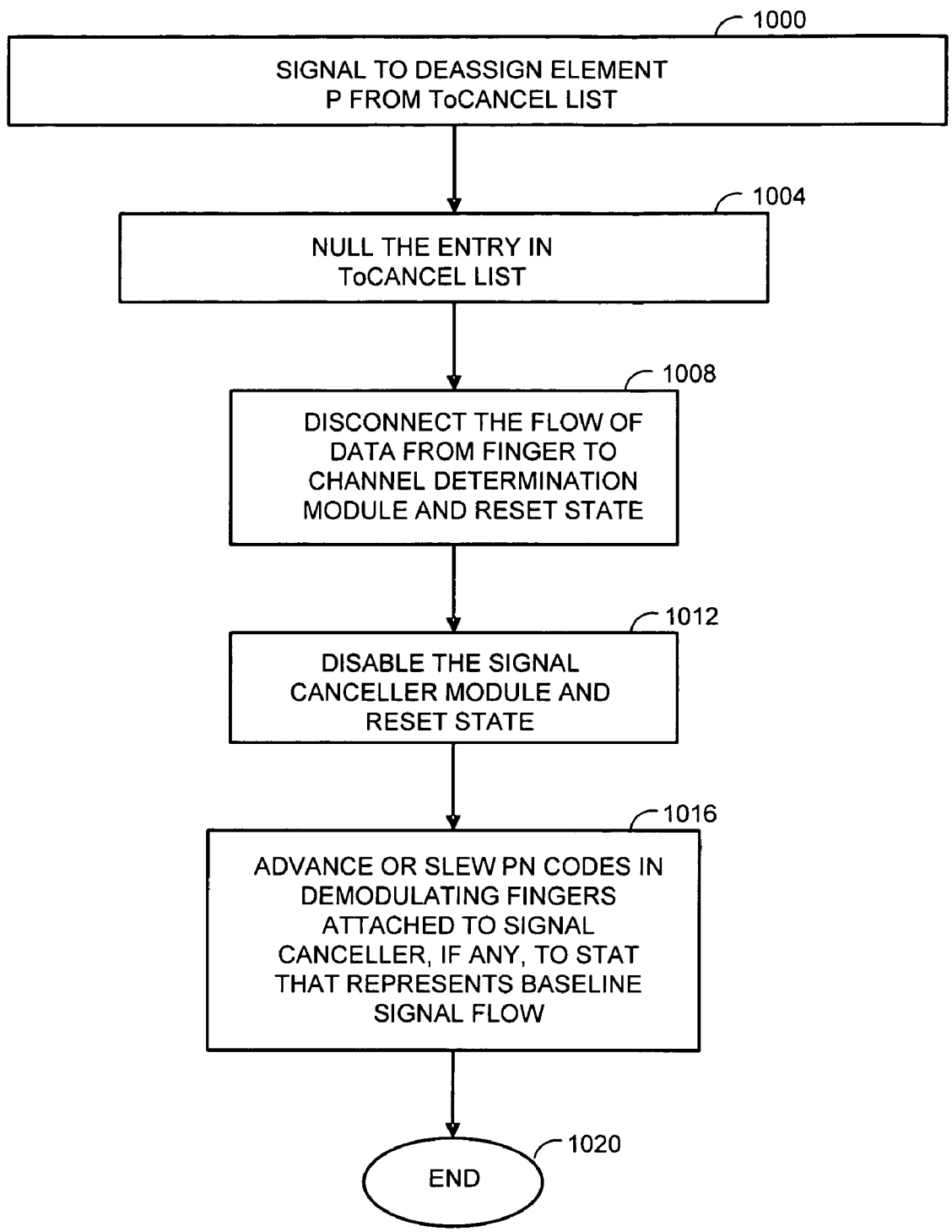
FIG. 10 is a flowchart illustrating a process for removing a path from a to cancel list in accordance with an embodiment of the present invention.

With reference now to FIG. 10, a process for removing a path from a to cancel list 420 in accordance with an embodiment of the present invention is illustrated. Initially, at step 1000, the cancellation controller 238 generates a signal to de-assign element p from the to cancel list 420. Thus, at step 1004, the corresponding entry in the to cancel list 420 is nulled. The flow of data from the finger 224 tracking the signal associated with element p to the channel determination module 232 is disconnected and the state of the channel determination module 232 is reset (step 1008). The corresponding signal cancellation module 236 is disabled and is also reset (step 1012). At step 1016, the PN codes in the demodulation fingers 224 are then advanced or slewed accordingly in order to synchronize with the baseline or raw signal 212. The process for removing a path from the to cancel list then ends (step 1020).

Figure 11:
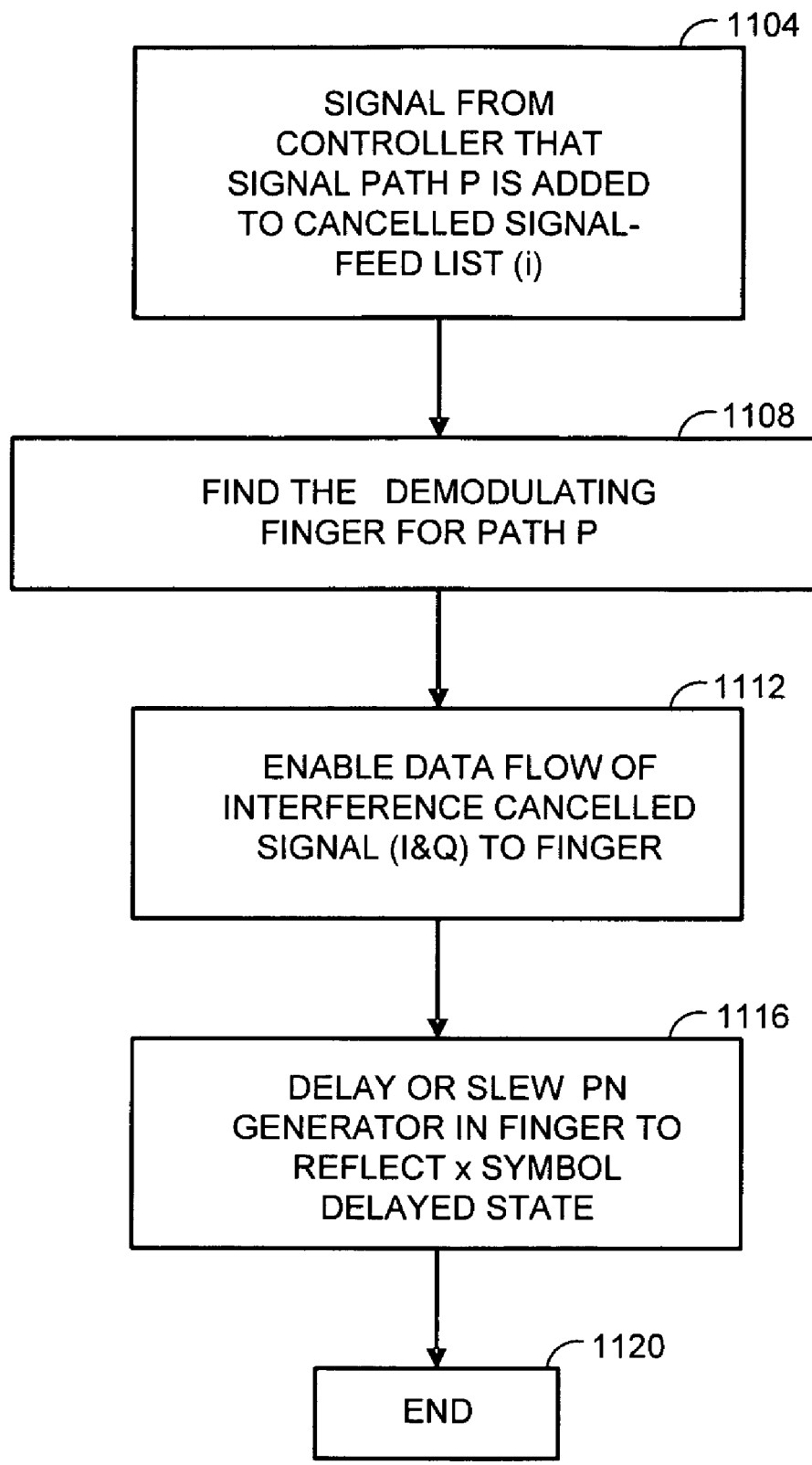
FIG. 11 is a flowchart illustrating a process for controlling the signal flow to a demodulation finger in accordance with an embodiment of the present invention.

With reference now to FIG. 11, a process for controlling the signal flow to a demodulation finger in accordance with an embodiment of the present invention is illustrated. Initially, at step 1104, the cancellation controller 228 signals that signal path p is to be added to the canceled signal feed list (i) 436. At step 1108, the demodulating finger 224 for path p is determined. At step 1112, a signal stream from which signal path p has been canceled is provided to the finger assigned to receive that interference cancelled signal stream (as shown in the canceled signal feed list 436). The PN generator in the demodulating finger 224 associated with the canceled signal feed list 436 is then delayed or slewed to synchronize with the interference canceled signal stream now being provided (step 1116). The process for controlling the signal flow to a demodulation finger then ends (step 1120).

As can be appreciated by one of skill in the art, the present invention provides a method and apparatus for selectively applying interference cancellation. In particular, the present invention allows either the provision of an interference cancelled signal stream or a non-interference cancelled signal stream to a demodulation finger, in order to provide the most favorable signal to noise ratio. It should further be appreciated that the present invention can be used in connection with any existing or newly developed signal cancellation procedure or mechanism to selectively apply such signal cancellation. In particular, by considering the effect or estimated effect of different signal streams on the reception of a desired signal path, the raw or interference cancelled signal streams providing a more favorable reception of a desired signal path can be selected. In particular, by allowing interference cancelled signal streams to be selectively applied, the present invention can avoid obtaining a degraded signal to noise ratio for a desired signal path as a result of the blind application of an interference cancelled signal stream. Specifically, the present invention provides a method and apparatus by which a preferred feed signal stream can be identified and provided to a demodulating finger.

Although the description provided herein has at times used examples of receivers comprising cellular telephones in spread spectrum systems, it should be appreciated that the present invention is not so limited. In particular, the present invention may be applied to any wireless communication system component implementing a wireless link or channel capable of using a plurality of channels substantially simultaneously. Accordingly, the present invention may be used in both mobile devices, such as telephones or other communication endpoints, or in wireless base stations or nodes. Furthermore, the present invention is not limited to terrestrial applications. For example, the present invention may be used in connection with satellite communication systems. In addition, the present invention is not limited to voice communication systems. For example, embodiments of the present invention may be applied to any multiple channel system, including radio locating systems, such as the global positioning system (GPS), multi-media communications, and data transmission systems.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for selectively enabling signal interference cancellation, comprising:
   identifying a plurality of signal paths in a searcher;
   for a set of said identified signal paths, determining an observed signal strength in a finger processor;
   identifying at least one of said signal paths as a potential interferer based at least in part on the observed signal strength;
   creating in an interference canceller at least a first interference cancelled signal stream by cancelling the interference from the at least one said potential interferer;
   determining whether providing said at least a first interference cancelled signal stream to at least a first signal processor will improve a signal to noise ratio of at least a first signal path assigned to said at least a first signal processor; and
   in response to determining that said at least a first interference cancelled signal stream will improve a signal to noise ratio of said signal path at least a first signal stream assigned to said at least a first signal processor, providing said at least a first interference cancelled signal stream to said at least a first signal processor.

2. The method of claim 1, further comprising:
   determining whether providing said at least a first interference cancelled signal stream to said at least a first signal processor will improve a signal to noise ratio of at least a first signal path assigned to said at least a first signal processor;
   in response to determining that said at least a first interference cancelled signal stream will not improve a signal to noise ratio of said at least a first signal path assigned to said at least a first signal processor, discontinuing said creating at least a first interference cancelled signal stream.

3. The method of claim 2, further comprising:
providing a non-interference cancelled signal stream to said at least a first signal processor.

4. The method of claim 1, wherein said set of identified signal paths comprises a set of assigned signal paths.

5. The method of claim 4, wherein said set of assigned signal paths is obtained from a demodulation path list.

6. The method of claim 1, wherein said identifying a plurality of potential interferers comprises identifying a first number of signal paths having at least a first signal strength.

7. The method of claim 1, further comprising:
listing said potential interferer in a cancellation candidate list.

8. The method of claim 7, further comprising updating a cancellation list by replacing a signal path in said cancellation list having a signal strength that is less than a signal strength of said potential interferer in said cancellation candidate list with said potential interferer.

9. The method of claim 1, further comprising updating a channel determination list by entering signal paths from said cancellation list in said channel determination list.

10. The method of claim 1, further comprising:
storing an identity of said plurality of signal paths in said channel to create a survey path list;
providing an interference canceled signal stream to a searcher element; and
updating said survey path list.

11. The method of claim 1, further comprising:
storing an identity of said plurality of signal paths to create a survey path list;
providing an interference canceled signal stream to a correlator element; and
updating said survey path list.

12. The method of claim 1, further comprising:
storing an identity of said at least a first interference cancelled signal.

13. A method for selecting a signal interference cancellation scheme, comprising:
populating a cancellation list in a cancellation controller with an identity of at least a first signal path that has been identified as an interfering signal path;
establishing a connection between a demodulating finger and one of a raw signal stream and an interference cancelled signal stream based on an entry in said cancellation list;
wherein the raw signal stream is provided to a first demodulating finger and the interference cancelled signal stream is provided to a second demodulating finger.

14. The method of claim 13, further comprising:
populating a cancellation candidate list comprising an identity of a signal path that is a potential interfering signal path;
canceling said potential interfering signal path from at least one other signal stream; and
determining whether a parameter associated with reception of said at least one other signal path improved as a result of said canceling of said potential interfering signal path.

15. The method of claim 14, wherein in response to determining that a parameter associated with reception of said at least one other signal path did not improve as a result of said canceling of potential interfering signal path, said establishing a connection comprises establishing a connection between said demodulating finger and a raw signal stream.

16. The method of claim 14, wherein in response to determining that a parameter associated with reception of said at least one other signal path did improve as a result of said canceling of potential interfering signal path, said establishing a connection comprises establishing a connection between said demodulating finger and an interference cancelled signal stream.

17. The method of claim 14, wherein said populating a cancellation candidate list comprises populating said cancellation candidate list with identities of a number of signals that are potential interfering signals.

18. The method of claim 14, wherein said at least a first potential interfering signal path has a signal strength that is greater than a predetermined threshold.

19. The method of claim 14, wherein said potential at least a first potential interfering signal path has a signal strength greater than another signal by at least a first predetermined amount.

20. The method of claim 13, further comprising:
providing a raw signal stream to a searcher finger;
creating a survey path list containing at least a first path identified in said raw signal stream by said searcher finger;
providing an interference cancelled signal stream to said searcher finger; and
updating said survey path list to include at least a second path identified in said interference cancelled signal stream by said searcher finger.

21. The method of claim 13, further comprising:
updating a signal feed list, wherein said signal feed list identifies for each demodulating finger a provided signal.

22. The method of claim 13, further comprising:
producing in said channel determination module an estimate of a signal path associated with a first one of said demodulating fingers;
creating a first interference cancelled signal stream by combining said estimate of said provided signal path with at least one of said raw signal stream and a second interference cancelled signal stream, wherein said first interference cancelled signal stream is provided to a second of said demodulating fingers.

23. The method of claim 22, wherein said combining of said estimate of said provided signal path with at least one of said raw signal stream and a second interference cancelled signal stream comprises subtracting a replica of said provided signal path from said at least one of said raw signal stream and said second interference cancelled signal stream.

24. The method of claim 22, wherein said combining of said estimate of said provided signal path with at least one of said raw signal stream and a second interference cancelled signal stream comprises projecting said raw signal stream and said second interference cancelled signal stream into subspace orthogonal to said provided signal path.

25. A method for selectively enabling signal interference cancellation, comprising:
identifying in a searcher at least one signal path in a set of signal paths;
for the at least one signal, determining an observed signal strength in a processing finger;
identifying at least one of said signal paths as a potential interferer based at least in part on the observed signal strength;
producing an interference cancelled signal stream, wherein said at least one signal path identified as a potential interferer is cancelled from said signal producing an interference cancelled stream; and correlating said interference cancelled signal stream with a reference signal; and in response to a strength of a desired signal having a strength that is not improved as a result of using said interference cancelled signal, providing a signal including said at least one signal path to a demodulation finger assigned to demodulate said desired signal.

26. The method of claim 25, further comprising:

correlating said interference cancelled signal stream with a reference signal; and in response to a strength of a desired signal path increasing as a result of creating said interference cancelled signal stream, providing said interference cancelled signal stream to a demodulating finger assigned to demodulate said desired signal path.

27. A method for selectively enabling signal interference cancellation, comprising:

providing to a cancellation controller a set of signal paths comprising at least one desired signal path;

identifying at least one signal path in the set of signal paths as a potential interferer with the desired signal path;

determining whether removing the at least one signal path in the set of signal paths will improve a signal to noise ratio (SNR) of the desired signal path by at least a selected threshold; and when the SNR of the desired signal path is improved by at least the selected threshold, removing the at least one signal from the signal stream in an interference canceller to form an interference canceled signal stream.

28. The method of claim 27, further comprising:

when the SNR or the desired signal path is not improved by at least the selected threshold amount, not removing the at least one signal path from the signal stream.

29. The method of claim 27, wherein said determining whether removing the at least one signal path in the set of signal paths will improve a SNR of the desired signal path comprises correlating a signal having the at least one signal path removed to a reference signal.

30. The method of claim 27, further comprising:

feeding said interference canceled signal stream to a demodulating finger.

31. A method for selecting a signal path for interference cancellation, comprising:

comparing in a cancellation controller a cancellation candidate list with a cancellation list, wherein each of the cancellation candidate list and cancellation list comprise at least a finger identifier and a signal identifier of an interfering signal path;

replacing any entry on the cancellation list with each entry in the cancellation candidate list that is not on the cancellation list; and updating a signal strength of each entry on both the cancellation and cancellation candidate lists with a signal strength on the cancellation candidate list.

32. The method of claim 31, further comprising:

producing at least a first signal stream in an interference canceller from which an interfering signal path included in said to cancel list has been cancelled;

determining whether a signal strength of a desired signal path has improved as a result of canceling said interfering signal.

33. The method of claim 32, further comprising:

in response to determining that said signal strength of a desired signal path has improved as a result of canceling said interfering signal path, providing said at least a first signal stream to a demodulating finger.

34. The method of claim 32, further comprising:

in response to determining that said signal strength of a desired signal path has not improved as a result of canceling said interfering signal stream, providing other than said at least a first signal stream to a demodulating finger.

35. A method for selecting a signal path for interference cancellation, comprising:

identifying in a cancellation controller at least one potentially interfering signal path in a signal stream;

removing said at least one potentially interfering signal path from said signal stream in an interference canceller;

searching said interference cancelled signal stream in a searcher, from which the at least one potentially interfering signal path has been removed, for each PN offset having a corresponding signal path possessing at least one of (a) a strength above a selected threshold and (b) a signal-to-noise improvement above a selected threshold; and providing said interference cancelled signal stream to each demodulating finger assigned to each PN offset having at least one of (a) and (b).

36. The method of claim 35, further comprising:

providing a raw signal stream to each demodulating finger assigned to each PN offset not having at least one of (a) and (b).

37. A receiver configured for processing a raw signal stream, comprising: a plurality of demodulation fingers;

a cancellation controller operable to selectively provide either or both of the raw signal stream and at least one interference cancelled signal stream to the plurality of demodulation fingers; and at least one cancellation module configured with the cancellation controller and operable to remove at least one replica of an interfering signal path from the raw signal stream to generate one of the at least one interference cancelled signal streams.

38. The receiver of claim 37, wherein the receiver is configurable within a mobile telephone or a base station.

39. The receiver of claim 37, further comprising a searcher finger, wherein the at least one cancellation controller selectively provides either the at least one interference cancelled signal stream or the raw signal stream to the searcher finger.

40. The receiver of claim 37, wherein the cancellation controller comprises at least one channel determination module communicatively coupled to the at least one cancellation module, wherein said at least one channel determination module is operable to provide at least one replica of an interfering signal path to the at least one channel determination module.

41. The receiver of claim 40, wherein a number of demodulation fingers in said plurality of demodulation fingers is greater than a number of channel determination modules in said plurality of channel determination modules.

42. The receiver of claim 37, wherein each of said demodulation fingers comprises a tracking module and a demodulation module.

* * * * *